United States Patent [19]

Kronogård

[11] 3,997,283
[45] Dec. 14, 1976

[54] AUTOMOTIVE GAS TURBINE POWER PLANT

[75] Inventor: Sven-Olof Kronogård, Lomma, Sweden

[73] Assignee: United Turbine AB & Co., Kommanditbolag, Malmo, Sweden

[22] Filed: Sept. 30, 1974

[21] Appl. No.: 510,769

[52] U.S. Cl. .................... 417/405; 415/122 R; 60/39.16 R; 74/DIG. 5; 74/681; 74/740

[51] Int. Cl.² .................................. F04B 35/00

[58] Field of Search ............... 60/39.16; 415/122 R; 74/DIG. 5, 481, 681–691, 740; 417/405

[56] References Cited
UNITED STATES PATENTS

| 3,286,543 | 11/1966 | Porter ................................. 74/687 |
| 3,488,947 | 1/1970 | Miller et al. ....................... 74/687 |
| 3,546,879 | 12/1970 | Hass ............................. 60/39.16 R |

FOREIGN PATENTS OR APPLICATIONS

| 519,169 | 3/1955 | Italy ................................. 417/405 |

Primary Examiner—C. J. Husar
Attorney, Agent, or Firm—Holman & Stern

[57] ABSTRACT

In order to obtain a low-cost, light-weight automotive gas turbine plant, the latter is provided with a compressor operating on a first shaft and a turbine operating on a second shaft formed as an element separate from that of the rotor. An infinitely variable transmission interconnects the first and second shafts and ensures that sufficient power for any operational condition is transferred from the turbine to the compressor.

2 Claims, 9 Drawing Figures

AUTOMOTIVE GAS TURBINE POWER PLANT

BACKGROUND OF THE INVENTION

It has, hitherto, not been possible to produce at low cost, a gas turbine having the properties suitable for operating light vehicles, such as small cars and trucks, light water craft or for simple industrial purposes, viz. a compact design for fitting into a restricted space, and having as satisfactory economy and driving prestanda.

One reason may be that the necessary driving of the compressor has been obtained by making the shaft of the compressor integral with, or connected to the shaft of the single turbine rotor in an inefficient manner. In order to attain a desirable simplicity of design and a reduced cost, it has been considered necessary to use a single turbine rotor only.

The acceleration properties of a compressor and turbine, and thus of the car in which the plant is mounted, is not at all acceptable if the speed of the compressor is directly related to the speed of the turbine. Alternatively, a complicated transmission and control device would be required, which is undesirable because it complicates the operation, reduces the efficiency and increases the costs.

SUMMARY OF THE INVENTION

According to the present invention, it is now proposed that the shaft of the compressor rotor and the shaft of the turbine rotor be formed as machine elements separate from each other, and be interconnected by an infinitely variable transmission system for transferring, from the turbine rotor to the compressor rotor, the power required for any operational condition.

This means not only that the plant will obtain favorable operational properties and a good fuel economy, but also fine possibilities of arranging the components of the plant in the manner most suitable to the space available in various types of cars and sizes thereof.

According to a further development of the invention, the shafts of the compressor and the rotor may be arranged horizontally, vertically, coaxially, in parallel or forming an angle to each other. The gears and a possible heat exchanger may, in an advantageous manner, be provided between the rotors. Certain compromises may have to be made with the more sophisticated and complicated units in order to reduce the price and to facilitate the servicing of the plant.

BRIEF DESCRIPTION OF THE DRAWINGS

The accompanying drawings show, by way of example, some different installations suited for small cars and water craft of different types.

DESCRIPTION OF SOME PREFERRED EMBODIMENTS

Figure 1:
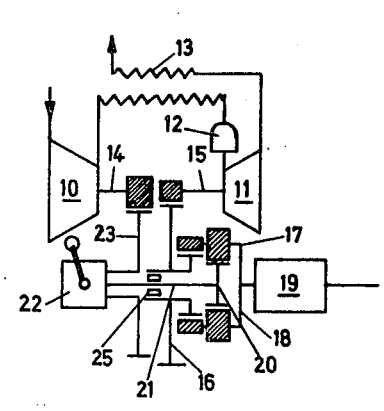
FIG. 1 shows a basic arrangement according to the invention.

The plant according to FIG. 1 includes a compressor 10, a turbine 11, a combustion chamber 12 and a heat exchanger 13. A shaft 14 of the compressor is an element separate from a shaft 15 of the turbine, but the shafts 14 and 15 are interconnected in such a manner that the required power for any condition of load can be transferred from the turbine to the compressor and to the output shaft, respectively.

The turbine shaft 15 is, by way of two meshing gear wheels 16, connected to a planetary gear having stepped planetary wheels 17. The output is taken from a carrier wheel 18 by way of a gear box 19 having reduction steps for forward running as well as one step for reversing. An inner sun wheel 20 in the planetary gear 18 is, by way of a shaft 21, connected to an infinitely variable transmission 22 which, by way of gear wheel 23, is connected to the compressor shaft 14. In this manner, the compressor may be also maintained in operating condition when the vehicle is at standstill, and it is easy to accelerate the compressor when starting the vehicle. For braking purposes, there is a freewheel 25 between shaft 21 and the compressor 10. When the infinitely variable transmission is of the belt type or some similar design, it may sometimes be advantageous to provide a slip coupling in series with the variable transmisssion.

Figure 2:
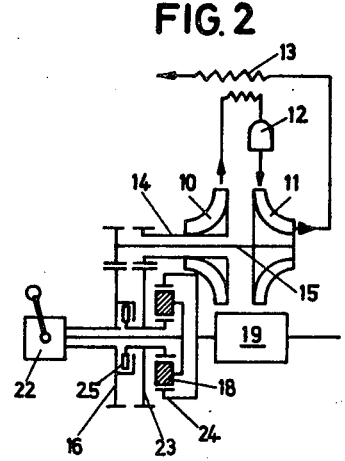
FIG. 2 shows a somewhat more advanced arrangement with concentric shafts and clutch means for interconnecting the same.

In FIG. 1, the two shafts 14 and 15 are aligned, but in FIG. 2, in which like elements are denoted by like reference numerals, the shafts 14 and 15 are concentric, which makes possible a very compact design. The power transfer between the turbine and the output shaft includes a simple planetary gear 23. Here, however, gear box 19, with the reversing step, is connected to an outer ring wheel 24. At the infinitely variable transmission 22, there is a clutch 25 between the driving turbine and compressor 10.

On occasions when a higher power output and/or acceleration is desired, it is favorable to provide the turbine with two rotors operating upon separate shafts interconnected by the above mentioned stepped planetary gear in a variable transmission system.

Figure 3:
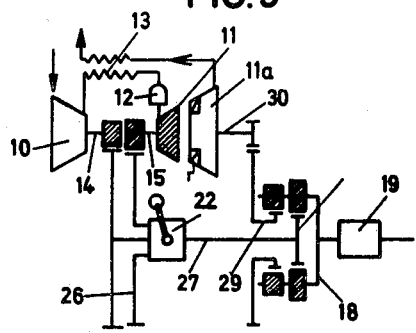
FIGS. 3 and 4 show plants adapted for higher outputs than those of FIGS. 1 and 2, FIGS. 5–8 schematically show different manners of locating the plant within the available space.

Such a plant is shown in FIG. 3. The left part of the drawing will substantially correspond to the arrangements according to FIG. 1. The first rotor 11 of the turbine drives the compressor shaft 14 by way of an intermediate wheel 26 and the variable transmission 22, and is also, by way of a shaft 27, connected to one of the sun wheel 28 in the stepped planetary gear 18, to a second sun wheel 29 of which the other turbine 11a is connected. The last mentioned turbine 11a delivers power to the output shaft as well as to the compressor in order to improve the acceleration properties thereof and to raise the pressure of the cycle, which improves the economy.

Figure 4:
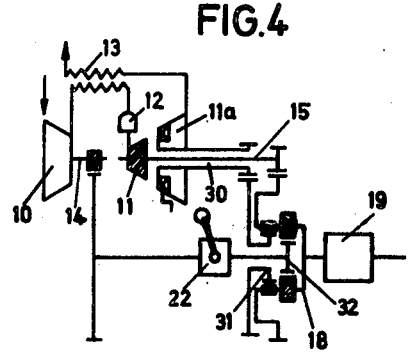

A modified arrangement is shown in FIG. 4. Here, the first turbine rotor 11, by way of its shaft 15, is connected to one of the planetary carriers in the stepped planetary gear 18, while shaft 30 of the second turbine rotor 11a is connected to one sun wheel 31 of the planetary gear. A second sun wheel 32 thereof is connected to the compressor shaft 14 by way of the variable transmission 22. Alternatively, one of the turbine rotors, preferably the low temperature one, may be provided with adjustable inlet guide vanes.

In all embodiments above described, the shafts of the turbines and the compressors have been arranged with their shafts horizontally. As is evident, from FIG. 5, the shafts may, as well, be mounted vertically, with the rotors then preferably being arranged in substantially the same horizontal plane and with the axes of the variable transmission 22 and the first reduction stage, i.e. the planetary gear 18, arranged vertically and is below the rotors. The output shaft, by way of a bevel gear 32, is connected to the final gear box reversing step 19. This arrangement provides a high degree of accessibility to the main components and a simple manner of mounting.

Figure 5:
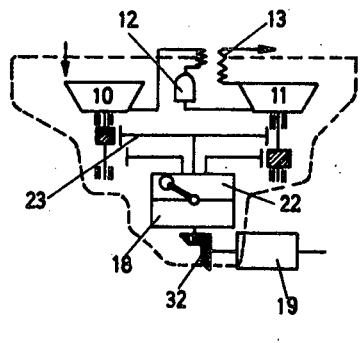
Figure 6:
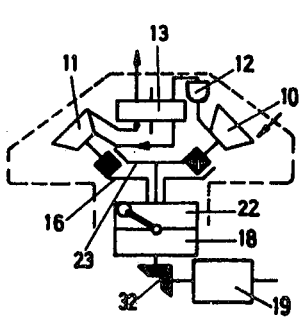

A modification of this arrangement is shown in FIG. 6, in which the shafts of the compressor and the turbine are arranged at an angle to each other to form a V, but in which the various components are mounted in basically the same manner as in FIG. 5.

Figure 7:
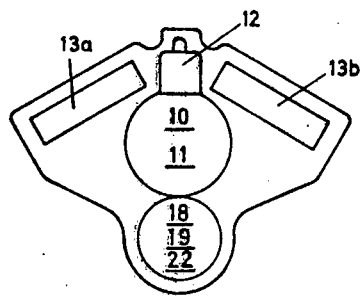

Similar arrangements, suited for cars normally provided with V-engines, may be obtained even if some, or all axes, of the turbine, the compressor and the transmission members are mounted horizontally. According to FIG. 7, the compressor and the turbine shafts are horizontal, and the axes of the transmission members 18, 19 and 22, are likewise horizontal, but located below the rotors. The combustion chamber 12 is located directly above the rotors and the heat exchanger is divided into two parts 13a and 13b, with the parts 13a and 13b being mounted in wing spaces outside the rotors. All components are easily accessible, may be serviced without a complete dismantling of the plant and are located within a profile which is ideal with respect to space available for the engine of a vehicle.

Figure 8:
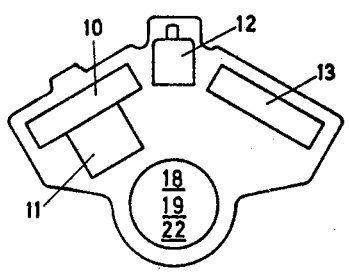

FIG. 8 shows a further modification in which the compressor 10 and the turbine 11 are axially aligned and arranged at an angle to the vertical plane. The transmission members 18, 19 and 22 are arranged below the rotors, but with their axes horizontally. The heat exchanger is located in a mirror image position with respect to the compressor and turbine rotors, and the combustion chamber 12 is fitted centrally between the rotors and the heat exchanger, directly above the transmission members.

Figure 9:
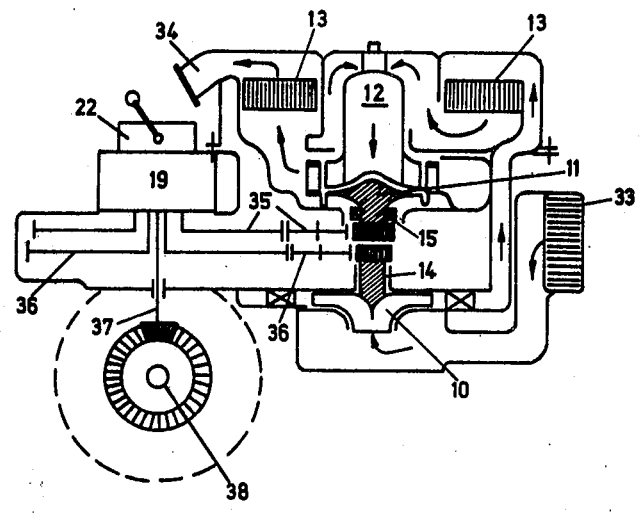
FIG. 9 shows such a mounting arrangement in more detail.

FIG. 9 shows a further manner of installing the plant. The compressor 10 and the turbine 11 are mounted with their shafts 14 and 15, respectively, vertically aligned. The combustion chamber 12 is provided directly above these rotors and the heat exchanger 13 is annular and encloses the combustion chamber. Air is drawn in by way of a combined filter and intake silencer 33 and is led down below the machinery. From the compressor, the air is conveyed by passages (not shown) to the air preheater, and then further on to the combustion chamber, from which the gases pass onto the turbine rotor and then through the preheater to an outlet 34. The air preheater will serve as an exhaust silencer. The turbine shaft 15 is, by way of a simple gearing 35, connected to the infinitely variable transmission 22, which on the one hand drives the compressor shaft by way of a single gearing 36, and on the other hand by way of an output shaft 37 in conventional manner works upon the differential at one of the axles 38 of the vehicle. The axes of all transmission members, thus, are vertical. The transmission members are located beside the turbine and compressor rotors. Also, in this arrangement, all main and auxiliary components are easily dismounted and accessible from above. The plant is suited for mounting in the rear of the vehicle as well as in front thereof, for driving the front wheels or the rear wheels, or possibly all four wheels. Due to its reduced height, the plant is also suited for mounting centrally in a vehicle for driving two or four wheels, and with the power output taken from the turbine or the compressor shaft.

The heat exchanger can be of the stationary, recuperative type, or a rotating unit, and may be arranged for axial or for radial flow of the fluids. In the last mentioned case, the passages may strictly radial, or be arcuate whereby the direction of flow remains constant and/or the desired area is obtained and further a desired rotation of the air flowing into the combustion chamber is obtained.

The embodiments above described are some examples only of the arrangements possible within the scope of the appended claims, and it is evident that further modifications and combinations may be made without departing from the spirit of the invention.

I claim:

1. In an automotive gas turbine power plant for a vehicle provided with wheels, including a turbine having a rotor, a first shaft, the turbine rotor being mounted on the first shaft, a compressor having a rotor, a second shaft separate from the first shaft, the compressor rotor being mounted on the second shaft, and transmission means interconnecting the first and second shafts adapted to transmit the power required for driving the compressor as well as to a power transfer shaft operably connected to the wheels of the vehicle, the improvement of a first reduction gear of the planetary type in the transmission means, said planetary gear having one input means and first and second independent output means, an infinitely variable transmission member connected to the first output means of the planetary gear for transferring power to the second shaft mounting the compressor in response to the occasional load upon the plant, and a second reduction gear including a reversing step connected to the second output means of said planetary gear for transferring power to the power transfer shaft, the first and second shafts being aligned in a horizontal direction, and the planetary gear is of the differential type having stepped planetary gear wheels, the input means including one sun wheel, the first output means including a second sun wheel, and said input means and first output means including concentric components.

2. In an automotive gas turbine power plant for a vehicle provided with wheels, including a turbine having a rotor, a first shaft, the turbine rotor being mounted on the first shaft, a compressor having a rotor, a second shaft separate from the first shaft, the compressor rotor being mounted on the second shaft, and transmission means interconnecting the first and second shafts adapted to transmit the power required for driving the compressor as well as to a power transfer shaft operably connected to the wheels of the vehicle, the improvement of a first reduction gear of the planetary type in the transmission means, said planetary gear having one input means and first and second independent output means, an infinitely variable transmission member connected to the first output means of the planetary gear for transferring power to the second shaft mounting the compressor in response to the occasional load upon the plant, and a second reduction gear including a reversing step connected to the second output means of said planetary gear for transferring power to the power transfer shaft, the first and second shafts being concentric, and the planetary gear including a sun wheel, planetary gear wheels, a planetary gear wheel carrier and an external ring wheel, the input means including the sun wheel, the first output means including the sun wheel, and the second output means including the planetary gear wheel carrier, with said input means and first output means including concentric components.

* * * * *